(12) United States Patent
Milvaney et al.

(10) Patent No.: US 11,874,802 B2
(45) Date of Patent: Jan. 16, 2024

(54) CATCH UP HEURISTICS FOR COLLABORATIVE APPLICATION ENVIRONMENTS

(71) Applicant: Microsoft Technology Licensing, LLC, Redmond, WA (US)

(72) Inventors: Douglas Lane Milvaney, Somerville, MA (US); Manoj Sharma, Winchester, MA (US); Manish Kumar Shukla, Lexington, MA (US); Simoune Rebekah Morena Valerio Lucas, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 4 days.

(21) Appl. No.: 17/667,237

(22) Filed: Feb. 8, 2022

(65) Prior Publication Data
US 2023/0136089 A1     May 4, 2023

Related U.S. Application Data

(60) Provisional application No. 63/274,048, filed on Nov. 1, 2021.

(51) Int. Cl.
    *G06F 16/178* (2019.01)
(52) U.S. Cl.
    CPC .................. *G06F 16/178* (2019.01)
(58) Field of Classification Search
    CPC ..................................... G06F 16/178
    USPC ......................................... 707/781
    See application file for complete search history.

(56) References Cited

U.S. PATENT DOCUMENTS

| | | | |
|---|---|---|---|
| 8,024,415 B2 | 9/2011 | Jacobs et al. | |
| 8,676,626 B1* | 3/2014 | Vance | G06Q 10/109 |
| | | | 709/204 |
| 10,063,660 B1* | 8/2018 | Coldham | H04L 67/131 |
| 2017/0177182 A1 | 6/2017 | Wong et al. | |
| 2017/0308610 A1* | 10/2017 | Mullins | G06F 16/38 |
| 2020/0076907 A1* | 3/2020 | Jalagam | H04L 67/535 |
| 2020/0162561 A1* | 5/2020 | Milvaney | G06F 9/542 |
| 2020/0296147 A1* | 9/2020 | Eliason | H04L 65/403 |
| 2021/0406449 A1* | 12/2021 | Meling | G06F 40/166 |
| 2022/0337537 A1* | 10/2022 | Lewis | G06F 40/166 |
| 2022/0353307 A1* | 11/2022 | Wang | G06N 20/00 |

OTHER PUBLICATIONS

"International Search Report and Written Opinion Issued in PCT Application No. PCT/US22/041766", dated Dec. 21, 2022, 11 Pages.

* cited by examiner

*Primary Examiner* — Cam Linh T Nguyen

(57) ABSTRACT

Aspects of the present disclosure relate to systems and methods for determining one or more relevant activities to surface for a user of one or more files hosted by a collaborative application. In one aspect, a set of collaborative activities that are applied by one or more users to one or more files hosted by the collaborative application may be captured. The set of collaborative activities may be analyzed in relation to the user of the one or more files hosted by the collaborative application. At least some activities in the set of collaborative activities may be identified as belonging to one or more relevance categories. A prioritization may be assigned to the at least some activities that belong to the one or more relevance categories.

20 Claims, 5 Drawing Sheets

200

Office.com

Home

Lorem ipsum dolor sit amet, consectetur adipiscing elit. Fusce vel varius orci, a elementum justo. Pellentesque id consequat sapien. Integer vulputate gravida est ut convallis. Ut porta gravida augue, vitae mattis eros porta at. Fusce orci massa, consectetur sit amet porttitor sit amet, elementum eu mi. Vestibulum id urna sagittis, ultrices tortor fermentum, tempus eros. Aliquam id commodo nisi, eu vulputate odio. Vestibulum vitae fringilla ligula, nec hendrerit diam. Donec ac tempus lacus, non rutrum ipsum.

Phasellus facilisis placerat lorem, quis varius quam hendrerit id. Sed rhoncus nulla sit amet orci tristique, et scelerisque lorem mattis. Nulla gravida faucibus sem, nec faucibus quam malesuada et. Proin mollis lorem leo, eu aliquet mauris molestie ut. Sed finibus facilisis turpis in eleifend. Quisque elementum mi arcu, vel tincidunt quam maximus a. Pellentesque mattis, arcu ut vulputate ullamcorper, ipsum metus scelerisque tellus, in facilisis nibh magna quis ipsum.

220

Daisy mentioned you 2m

Carlos assigned you a task 10m

David replied to your comment 4h

CATCH UP HEURISTICS FOR COLLABORATIVE APPLICATION ENVIRONMENTS

RELATED APPLICATIONS

This application is related to—and claims the benefit of priority to—U.S. Patent Application No. 63/274,048, filed on Nov. 1, 2021, and entitled CATCH UP HUERISTICS IN A FOR YOU EXPERIENCE, which is hereby incorporated by reference in its entirety.

TECHNICAL FIELD

Aspects of the disclosure are related to the field of computer software applications and, in particular, to technology solutions for collaborative computing environments.

BACKGROUND

Computer and software users have grown accustomed to user-friendly software applications for co-authoring files, documents, messages, and the like. For example, storage providers (e.g., cloud storage providers) provide applications where users can co-author and collaborate with one another within the applications. As more users share, co-author, and collaborate on documents created with these applications, it becomes increasingly difficult for users to stay apprised of changes to the documents, whether users are in or away from the applications. Current techniques for solving this problem include surfacing all changes to a document such that the changes might not be relevant to a given user or only surfacing changes that explicitly reference a given user. As a result, interacting with and collaborating in a document may be cumbersome, difficult, and inefficient, ultimately resulting in a lack of participating in document interaction and/or collaboration. In turn, current techniques for apprising users of content changes are inefficient and inadequate.

Overview

This Overview is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for determining one or more relevant activities to surface for a user of one or more files hosted by a collaborative application. In one aspect, a set of collaborative activities that are applied by one or more users to one or more files hosted by the collaborative application may be captured. The set of collaborative activities may be analyzed in relation to the user of the one or more files hosted by the collaborative application. At least some activities in the set of collaborative activities may be identified as belonging to one or more relevance categories. A prioritization may be assigned to the at least some activities that belong to the one or more relevance categories.

In another aspect, a method for creating a user specific experience in a collaborative application is presented. A set of collaborative activities applied to one or more files hosted by the collaborative application may be identified. It may be determined whether at least some of the activities in the set of collaborative activities belong to an explicitly directed category. When it is determined that at least some of the activities in the set of collaborative activities belong to the explicitly directed category, at least one notification may be sent to surface the activities belonging to the explicitly directed category in a user interface to the collaborative application.

In yet another aspect, a set of collaborative activities applied to one or more files hosted by a collaborative application may be identified. It may be determined that one or more activities in the set of collaborative activities are relevant to a user of the one or more files hosted by the collaborative application. The one or more activities determined to be relevant to the user may be assigned to one or more relevance categories. Each of the one or more relevance categories has an associated user interface experience. At least one notification may be sent to surface the one or more activities assigned to at least one of the one or more relevance categories according to the associated user interface experience in a user interface to the collaborative application.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 illustrates one view of a collaboration application displayed on a user interface of a client computing device, according to an example aspect.

DETAILED DESCRIPTION

Figure 1:
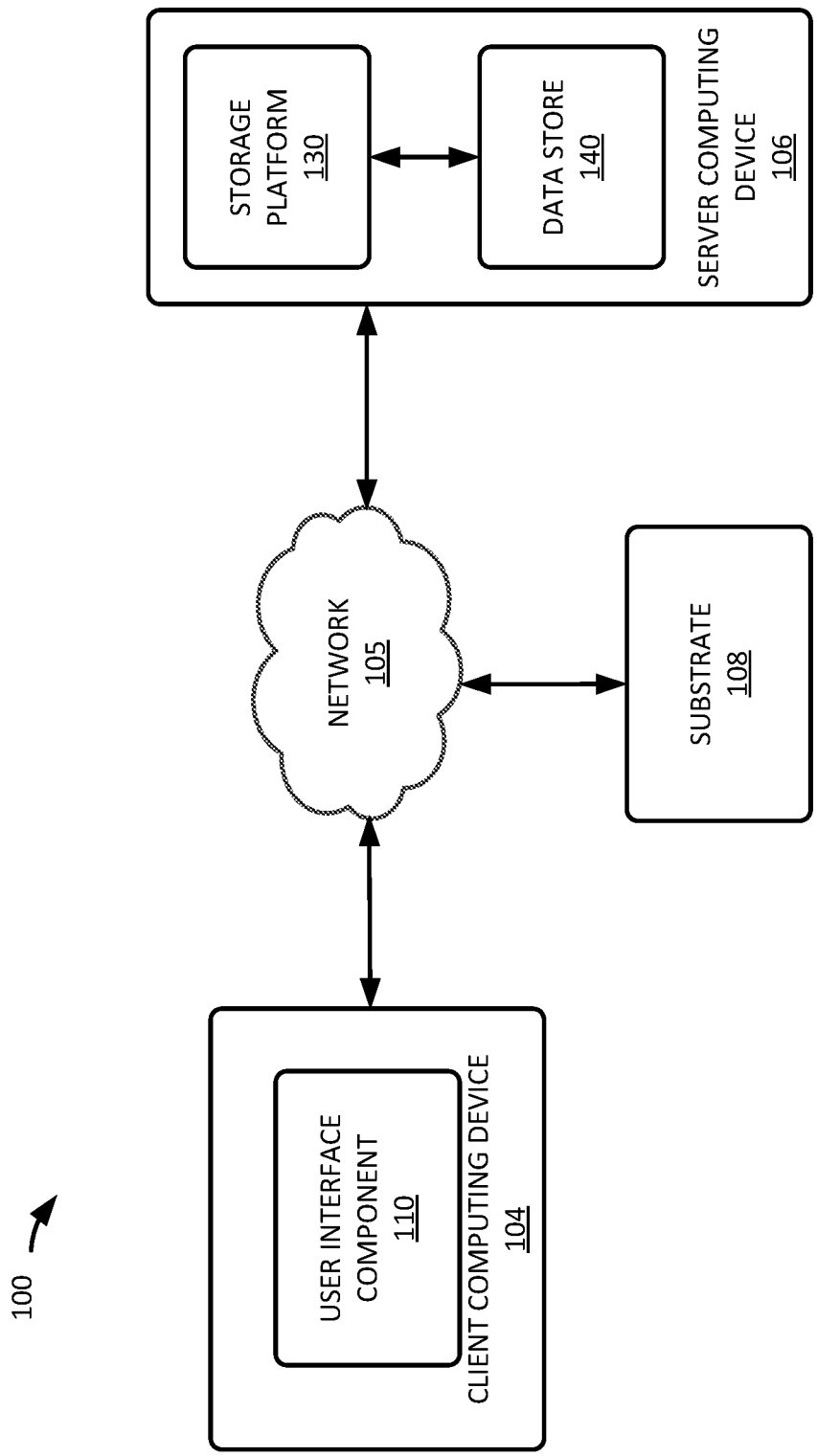
FIG. 1 illustrates an exemplary catch-up heuristic system for determining one or more relevant activities to surface for a user of one or more files hosted by a collaborative application, according to an example aspect.

Aspects of the disclosure are generally directed to determining one or more relevant activities to surface for a user of one or more files hosted by a collaborative application. For example, a collaborative application facilitates collaboration between team members working on a project together, for example. The team members can see each other's activity associated with one or more files in real-time. In one example, the set of files to which the team members have shared access is a workspace. As such, each user (e.g., team member) of the set of files may have their own workspace environment associated with the collaborative application and the one or more shared files. A user interface to the collaborative application may facilitate navigation between these one or more shared files in each users workspace. For example, one or more activities determined to be relevant to a user of the one or more shared files may be surfaced in the user interface to the collaborative application. In this regard, users/team members of the collaborative application may quickly and easily view what is important to them and what activities and/or files need their attention at the right time in their workspace environment.

As discussed above, computer and software users have grown accustomed to user-friendly software applications for co-authoring files, documents, messages, and the like. For example, storage providers (e.g., cloud storage providers) provide applications where users can co-author and collaborate with one another within the applications. As more users share, co-author, and collaborate on documents created with these applications, it becomes increasingly difficult for users to stay apprised of changes to the documents, whether users are in or away from the applications. Current techniques for solving this problem include surfacing all changes to a document such that the changes might not be relevant to a given user or only surfacing changes that explicitly reference a given user. As a result, interacting with and collaborating in a document may be cumbersome, difficult, and inefficient, ultimately resulting in a lack of participating in document interaction and/or collaboration. In turn, current techniques for apprising users of content changes are inefficient and inadequate.

Accordingly, aspects described herein include creating a user specific experience in a collaborative application. For example, a set of collaborative activities applied to one or more files hosted by the collaborative application may be identified. As users of the plurality of files (e.g., shared files) apply/input activities to the shared files, the activities may be published to a substrate. The substrate may include any service and/or data store for storing activities and information associated with activities. In one example, the substrate is located separate from (e.g., outside) the collaborative application.

The substrate may further include any logic for processing and/or analyzing the activities and associated activity information. For example, the substrate may use logic to determine one or more relevant activities to surface for a user of one or more files hosted by the collaborative application. In another example, the substrate may use logic to assign the one or more activities determined to be relevant to the user to one or more relevance categories. In another example, the substrate may include logic to send at least one notification to surface the one or more activities assigned to the one or more relevance categories in a user interface to the collaborative application. In some cases, each of the one or more relevance categories has an associated user interface experience. For example, each relevance category may influence the user interface experience for a given user.

In some examples, the one or more relevance categories include at least one of an explicitly directed category, an explicitly undirected category, an implicit category, and a general category. A prioritization may be assigned to the one or more activities assigned to the one or more relevance categories. For example, the explicitly directed category may be assigned a higher prioritization than the implicit category and/or the general category. With a higher prioritization, activities assigned to the explicitly directed category may be deemed very relevant to a user. As such, these activities may be surfaced to the user quickly and loudly to ensure a user of the collaborative application is notified of these activities.

As such, a technical effect that may be appreciated is that important and relevant activities for each user of the shared files are surfaced in a clear and understandable manner and on a functional surface so that a user may quickly and efficiently understand, identify, interact with, navigate, collaborate and receive feedback regarding content/activities of the shared file. Another technical effect that may be appreciated is that users and/or team members of a file may quickly, easily, and efficiently view, navigate and interact with shared files, and activities/content while collaborating within applications.

Yet another technical effect that may be appreciated is that the continual surfacing of user relevant activities (e.g., instead of surfacing all activities) in a user interface to shared files for each user of the collaborative application facilitates efficiently updating and apprising a user of content/activities associated with the shared files across all instances of the collaborative application and unique workspace environments in multiple locations, across multiple files in real-time and therefore avoids incurring network roundtrip costs and does not affect the data server storage.

Referring now to the drawings, in which like numerals represent like elements through the several figures, aspects of the present disclosure and the exemplary operating environment will be described. With reference to FIG. 1, one aspect of a catch-up heuristic system 100 for determining one or more relevant activities to surface for a user of one or more files hosted by a collaborative application is illustrated. The catch-up heuristic system 100 may include a client computing device 104, a server computing device 106, and a substrate 108. In aspects, the catch-up heuristic system 100 may be implemented on the client computing device 104. In a basic configuration, the client computing device 104 is a handheld computer having both input elements and output elements. The client computing device 104 may be any suitable computing device for implementing the catch-up heuristic system 100 for determining one or more relevant activities to surface for a user of one or more files hosted by a collaborative application. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; etc. This list is exemplary only and should not be considered as limiting. Any suitable client computing device 104 for implementing the catch-up heuristic system 100 for determining one or more relevant activities to surface for a user of one or more files hosted by a collaborative application may be utilized.

In aspects, the catch-up heuristic system 100 may be implemented on the server computing device 106. The server computing device 106 may provide data to and from the client computing device 104 through a network 105. In aspects, the catch-up heuristic system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the catch-up heuristic system 100 may include the client computing device 104, the server computing device 106, and the substrate 108. The various components may be implemented using hardware, software, or a combination of hardware and software. In aspects, the client computing device 104 may include a user interface component 110. The user interface component 110 may be configured to surface and/or display one or more relevant activities for a user of one or more files hosted by a collaborative application. In one example, a collaborative application may include any application suitable for collaboration, co-authoring, and/or sharing between team members such as Office applications, email applications, chat applications, voice application, such as OneNote, Outlook, Teams, Fluid and the like. In one case, the one or more files hosted by the collaborative application may include Office files such as a word document, a spreadsheet, an electronic slide presentation, an email, a chat conversation, OneNote pages, workspaces, and the like.

The client computing device 104 and/or user interface component 110 may be configured to display the one or more relevant activities according to a notification catch-up experience. The notification catch-up experience may include a user interface experience that is tailored based on a variety of factors including a device, an application, the user, relevance categories, and activity prioritization. For example, the one or more relevant activities may be surfaced in an email application. In this example, the notification catch-up experience may include an email digest with a batch of relevant activities. In another example, the one or more relevant activities may be surfaced on a mobile device. In this example, the notification catch-up experience may include a catch-up flyout that includes one or more relevant activities. In yet another example, the one or more relevant activities may be surfaced in a collaborative application. The one or more relevant activities may be surfaced and displayed in a workspace, in one or more files, and/or outside of one or more files. In this example, the notification catch-up experience may include a notification activity badge.

In other aspects, it may be determined that a user has specific preferences for a notification catch-up experience. For example, the user may prefer to receive a notification activity badge with one or more relevant activities. In another example, the user may prefer to receive notification emails with the one or more relevant activities. In yet another example, the user may prefer to receive catch-up notifications via a chat application while they are in meetings with other team members/collaborators on one or more files. In this example, the user can quickly and easily see the relevant activities and discuss the relevant activities with team members during the meeting.

In other examples, the one or more relevant activities may be assigned to one or more relevance categories. The one or more relevance categories may include at least one of an explicitly directed category, an explicitly undirected category, an implicit category, and a general category. As such, the catch-up notification experience may be tailored according to each of the one or more relevance categories. For example, when the one or more activities are assigned to the explicitly directed category the catch-up notification experience may include sending notifications more quickly as the activities happen and more often. In this example, the catch-up notification experience may include interrupting the user as they are working within a file to get their attention. In another example, when the one or more activities are assigned to the explicitly undirected category the catch-up notification experience may include sending the notifications after a delay (e.g., the notification with relevant activities may not be sent immediately).

In another example, when the one or more activities are assigned to the implicit category, there may be another determination on whether to send the notification with the relevant activities. It may be determined how relevant the activities are that are assigned to the implicit category. As such, the one or more activities may be batched and delayed before a notification is sent. In another example, instead of sending a notification, the one or more files and/or workspaces may be bolded or badged to notify the user of activities. In another example, when the one or more activities are assigned to the general category, there is a low likelihood that these activities will be sent via notification. In some examples, notification of the one or more activities in the general category may be given as an overview in a non-intrusive way.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In some aspects, the client computing device 104 and/or the user interface component 110 may publish activities input by one or more users of one or more files hosted by the collaborative application to the substrate 108. The substrate 108 may be configured to receive, store, create, generate, update, manage, analyze and access one or more activities and/or information associated with the catch-up heuristic system 100. For example, the substrate 108 may receive, store, create, generate, update, analyze and manage one or more activities associated with the one or more files hosted by the collaborative application. In another example, the substrate 108 may provide access to the one or more activities associated with the one or more files hosted by the collaborative application. In one case, the client computing device 104, the server computing device 106, and/or a collaborative application associated with the client computing device 104 and/or the server computing device 106 may access the substrate 108.

In other examples, the substrate 108 may be configured to determine whether at least some of the activities in the set of collaborative activities belong to at least one of an explicitly directed category, an explicitly undirected category, an implicit category, and a general category. As such, as or after activities are published to the substrate 108, the substrate 108 may determine whether at least some of the activities in the set of collaborative activities belong to at least one of an explicitly directed category, an explicitly undirected category, an implicit category, and a general category.

The substrate 108 may determine that at least some of the activities belong to the explicitly directed category when another user has explicitly directed something at the user. For example, this includes user-to-user activity where the creator of the activity explicitly chooses who they want to reach. Explicitly directed activities may include @mentions, assigning a task to a user, and/or tagging a user (e.g., in an agenda). The substrate 108 may determine that at least some of the activities belong to the explicitly undirected category when another user has explicitly included the user but not explicitly directed at the user. For example, explicitly undirected activities may include replies to a comment/conversation thread the user previously responded to and/or is mentioned/tagged in, reactions to a message the user wrote and/or something the user is mentioned/tagged in, an update in a due date associated with the user, another user resolving or reassigning a task that is assigned to the user, and the like.

The substrate 108 may determine that at least some of the activities belong to the implicit category when there isn't an explicit reference in the activity to a user. For example, the implicit activities may include project management related activities that apply to entire file/page (e.g., a due date, global comment) that the user has contributed to. The implicit activities may include activities that happen to content in which the user has edited or presented an interest in. For example, in Fluid, content is attributed to so the substrate 108 can determine when users have edited content. Other implicit activities may include sizable changes to the user's content, another user leaving a comment and/or reaction on content the user wrote, and the like. Furthermore, recency and newness facilitate determining whether activities fall into the implicit category. For example, some implicitly relevant activities may be implicitly relevant based on a unique last view time of a file by the user. The substrate 108 may determine that at least some of the activities belong to the general category when the activities are irrelevant to the user. For example, generic activities that a user may care about include edits to files by other users, when files are shared by another user, and the like.

The substrate 108 may be configured to assign a prioritization to the at least some activities that are determined to belong to at least one of the explicitly directed category, the explicitly undirected category, the implicit category, and the general category. In one example, the substrate 108 may assign a first priority level to the explicitly directed category. The first priority level may include the highest level of prioritization. As such, the first priority level may include activities that are sent immediately, often, and are loud (e.g., the activity notification may be very apparent to a user to get the attention of a user). In another example, the substrate 108 may assign a second priority level to the explicitly undirected category. The second priority level may include the second highest level of prioritization. In this regard, the second priority level may include activities that are delayed in being sent. In one example, the activities assigned the second priority level may be batched instead of sent immediately.

In another example, the substrate 108 may assign a third priority level to the implicit category. The third priority level may include a lower level of prioritization than the first priority level and the second priority level. In this regard, the third priority level may include activities that are inferred as being relevant to the user. As such, the activities assigned the third priority level may not be sent as often as other activities assigned a higher priority level. In this regard, a reduction in noise and obtrusion with regard to the activities assigned the third priority level may be realized. In another example, the substrate 108 may assign a fourth priority level to the general category. The fourth priority level may include the lowest level of prioritization. The activities assigned the fourth priority level may be given to a user as an overview.

In another example, the server computing device 106 may publish activities input by one or more users of a plurality of files hosted by a collaborative application to the substrate 108. The server computing device 106 may be configured to receive one or more relevant activities including at least some of the activities from the substrate 108. In this regard, the server computing device 106 may receive a notification to surface the one or more relevant activities for a user of the collaborative application. The one or more activities as discussed herein may include at least presence (e.g., users with the file currently open), recency of edits, number of edits, recency of comments, number of comments, presentation in a video meeting application, unread edits for the current user, unread comments for the current user, the files a user currently has open, the number of users that currently have some file open, files that have recent edits, the size of recent edits in each file, whether the recent edits in each file are unread by the current user, files that have recent comments, the size of recent comments in each file, whether the recent comments in each file are unread by the current user, files that have been recently created or added to the collaborative application and/or a unique user workspace, files currently being presented by users in a workspace and/or collaborative application or in a meeting, and any other similar activity signals and/or activities and any combination of the activity signals and/or activities.

The server computing device 106 may include a storage platform 130 and the data store 140. In one example, the storage platform 130 may be configured to store, manage, and access data and/or information associated with the catch-up heuristic system 100. For example, the storage platform 130 may store one or more files and/or one or more activities associated with a file in a data store 140. In another example, the data store 140 may include attribution information. In one example, data store 140 may be part of and/or located at the storage platform 130. In another example, data store 140 may be a separate component and/or may be located separate from the storage platform 130. It is appreciated that although one server computing device 106 is illustrated in FIG. 1, the catch-up heuristic system 100 may include a plurality of server computing devices 106 with a plurality of storage platforms 130 and a plurality of data stores 140. In some cases, the server computing device 106 may include a plurality of storage platforms 130 and a plurality of data stores 140. For example, the plurality of storage platforms 130 may include at least file storage providers, external activity services and document editing clients. In one example, the storage platform 130 may be a cloud storage service such as OneDrive, SharePoint, Google Drive, Dropbox, and the like.

In aspects, the storage platform 130 may communicate with the client computing device 104 and/or the substrate 108. In this regard, the storage platform 130 may retrieve and/or obtain one or more activities associated with one or more files from the substrate 108. In another case, the storage platform 130 may send one or more activities associated with one or more files to the substrate 108 for storage and/or processing.

It is appreciated that the collaborative application discussed herein, may be hosted, implemented and/or executed on the client computing device 104 and the server computing device 106. The collaborative application may perform the functions, steps, and processes as described herein relative to both the client computing device 104 and the server computing device 106. It is further appreciated that all the functions, steps, and processes described relative to the client computing device 104 may be performed by the server computing device 106.

Referring now to FIG. 2, an example view 200 of a collaborative application displayed on a user interface of the client computing device 104, such as a desktop computer, tablet computer or a mobile phone, for example, is shown. The exemplary application, as shown in FIG. 2, is a word processing application. In one example, an application may include any application suitable for collaboration and/or co-authoring such as a word processing application, spreadsheet application, electronic slide presentation application, email application, chat application, voice application, and the like. In one case, a file associated with and/or created with the application may include a word document, a spreadsheet, an electronic slide presentation, an email, a chat conversation, and the like.

The exemplary collaborative application, as shown in FIG. 2, is an Office application. As illustrated, the exemplary view 200 of the Office application displayed on the client computing device 104 includes an open file 204 and an activity badge 220. As illustrated in FIG. 2, the activity badge 220 is surfaced and/or displayed in a user interface to the collaborative application. In this example, the activity badge 220 includes three relevant activities. The first activity (e.g., an @mention activity) and the second activity (e.g., assignment of a task) are in the explicitly directed category. The third activity (e.g., a reply to a comment by the user) is in the explicitly undirected category. As such, a user of the collaborative application illustrated in FIG. 2 may quickly and easily be notified of activities relevant to the user.

Figure 3:
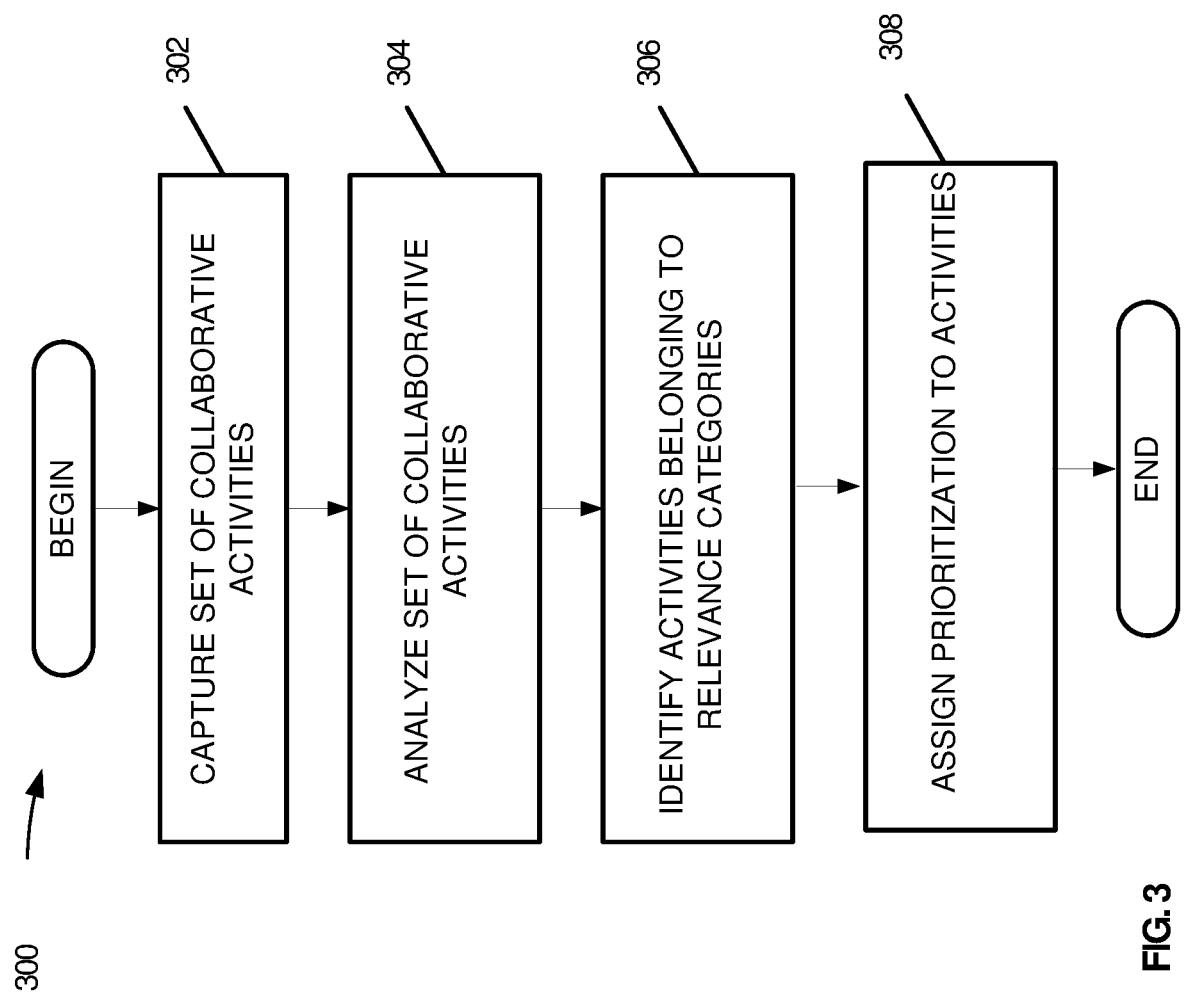
FIG. 3 illustrates an exemplary method for determining one or more relevant activities to surface for a user of one or more files hosted by a collaborative application, according to an example aspect.

Referring now to FIG. 3, an exemplary method 300 for determining one or more relevant activities to surface for a user of one or more files hosted by a collaborative application, according to an example aspect is shown. Method 300 may be implemented on a computing device or a similar electronic device capable of executing instructions through at least one processor. Method 300 may begin at operation 302, where a set of collaborative activities that are applied by one or more users to one or more files hosted by the collaborative application are captured. As users of the plurality of files (e.g., shared files) apply/input activities to the shared files, the activities may be published to a substrate. The substrate may include any service and/or data store for storing activities and information associated with activities. In one example, the substrate is located separate from (e.g., outside) the collaborative application. The substrate may further include any logic for processing and/or analyzing the activities and associated activity information.

When a set of collaborative activities that are applied by one or more users to one or more files hosted by the collaborative application are captured, flow proceeds to decision operation 304 where the set of collaborative activities are analyzed in relation to the user of the one or more files hosted by the collaborative application. The set of collaborative activities may be analyzed in relation to the user of the one or more files hosted by the collaborative application to determine which activities in the set of collaborative activities are relevant to the user. In another example, the set of collaborative activities may be analyzed in relation to the user of the one or more files hosted by the collaborative application to determine how to send notifications to surface the relevant activities to the user. For example, catch-up activity notifications may be sent immediately, with a delay, by batching activities, more often or less often, and the like.

When the set of collaborative activities are analyzed in relation to the user of the one or more files hosted by the collaborative application flow proceeds to operation 306 where at least some activities in the set of collaborative activities are identified as belonging to one or more relevance categories. In one example, the one or more relevance categories include at least one of an explicitly directed category, an explicitly undirected category, an implicit category, and a general category. In one example, explicitly directed activities may include @mentions, assigning a task to a user, and/or tagging a user (e.g., in an agenda). In one example, explicitly undirected activities may include replies to a comment/conversation thread the user previously responded to and/or is mentioned/tagged in, reactions to a message the user wrote and/or something the user is mentioned/tagged in, an update in a due date associated with the user, another user resolving or reassigning a task that is assigned to the user, and the like. The implicit activities may include project management related activities that apply to entire file/page (e.g., a due date, global comment) that the user has contributed to. The implicit activities may include activities that happen to content in which the user has edited or presented an interest in. For example, in Fluid, content is attributed to so the substrate 108 can determine when users have edited content. Other implicit activities may include sizable changes to the user's content, another user leaving a comment and/or reaction on content the user wrote, and the like. Furthermore, recency and newness facilitate determining whether activities fall into the implicit category. Generic activities that a user may care about include edits to files by other users, when files are shared by another user, and the like.

When at least some activities in the set of collaborative activities are identified as belonging to one or more relevance categories flow proceeds to operation 308 where a prioritization is assigned to the at least some activities that belong to the one or more relevance categories. In one example, a first priority level may be assigned to an explicitly directed category. The first priority level may include the highest level of prioritization. As such, the first priority level may include activities that are sent immediately, often, and are loud (e.g., the activity notification may be very apparent to a user to get the attention of a user). In another example, a second priority level may be assigned to an explicitly undirected category. The second priority level may include the second highest level of prioritization. In this regard, the second priority level may include activities that are delayed in being sent. In one example, the activities assigned the second priority level may be batched instead of sent immediately. In another example, a third priority level may be assigned to an implicit category. The third priority level may include a lower level of prioritization than the first priority level and the second priority level. In this regard, the third priority level may include activities that are inferred as being relevant to the user. As such, the activities assigned the third priority level may not be sent as often as other activities assigned a higher priority level. In another example, a fourth priority level may be assigned to a general category. The fourth priority level may include the lowest level of prioritization. The activities assigned the fourth priority level may be given to a user as an overview.

Figure 4:
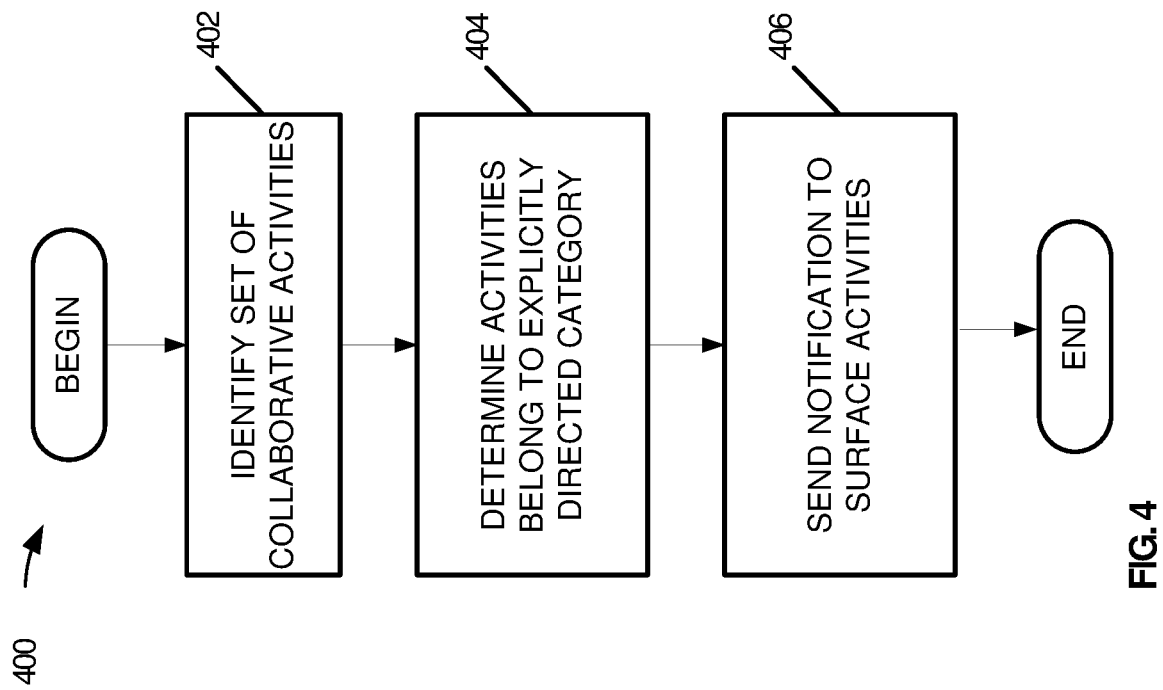
FIG. 4 illustrates an exemplary method for creating a user specific experience in a collaborative application, according to an example aspect.

Referring now to FIG. 4, an exemplary method 400 for creating a user specific experience in a collaborative application, according to an example aspect is shown. Method 400 may be implemented on a computing device or a similar electronic device capable of executing instructions through at least one processor. Method 400 may begin at operation 402, where a set of collaborative activities applied to one or more files hosted by the collaborative application are identified. As users of the plurality of files (e.g., shared files) apply/input activities to the shared files, the activities may be published to a substrate. The substrate may include any service and/or data store for storing activities and information associated with activities. In one example, the substrate is located separate from (e.g., outside) the collaborative application. The substrate may further include any logic for processing and/or analyzing the activities and associated activity information.

When a set of collaborative activities applied to one or more files hosted by the collaborative application are identified, flow proceeds to decision operation 404 where it is determined whether at least some of the activities in the set of collaborative activities belong to an explicitly directed category. It may be determined that at least some of the activities belong to the explicitly directed category when another user has explicitly directed something at the user. For example, this includes user-to-user activity where the creator of the activity explicitly chooses who they want to reach. Explicitly directed activities may include @mentions, assigning a task to a user, and/or tagging a user (e.g., in an agenda).

When it is determined whether at least some of the activities in the set of collaborative activities belong to an explicitly directed category flow proceeds to operation 406 where at least one notification is sent to surface the activities belonging to the explicitly directed category in a user interface to the collaborative application. In one example, the activities may be surfaced in an email application. In this example, the sent notification may include an email digest with a batch of relevant activities. In another example, the activities may be surfaced on a mobile device. In this example, the sent notification may include a catch-up flyout that includes one or more relevant activities. In yet another example, the activities may be surfaced in a collaborative application. The activities may be surfaced and displayed in a workspace, in one or more files, and/or outside of one or more files. In this example, the sent notification may include a notification activity badge.

Figure 5:
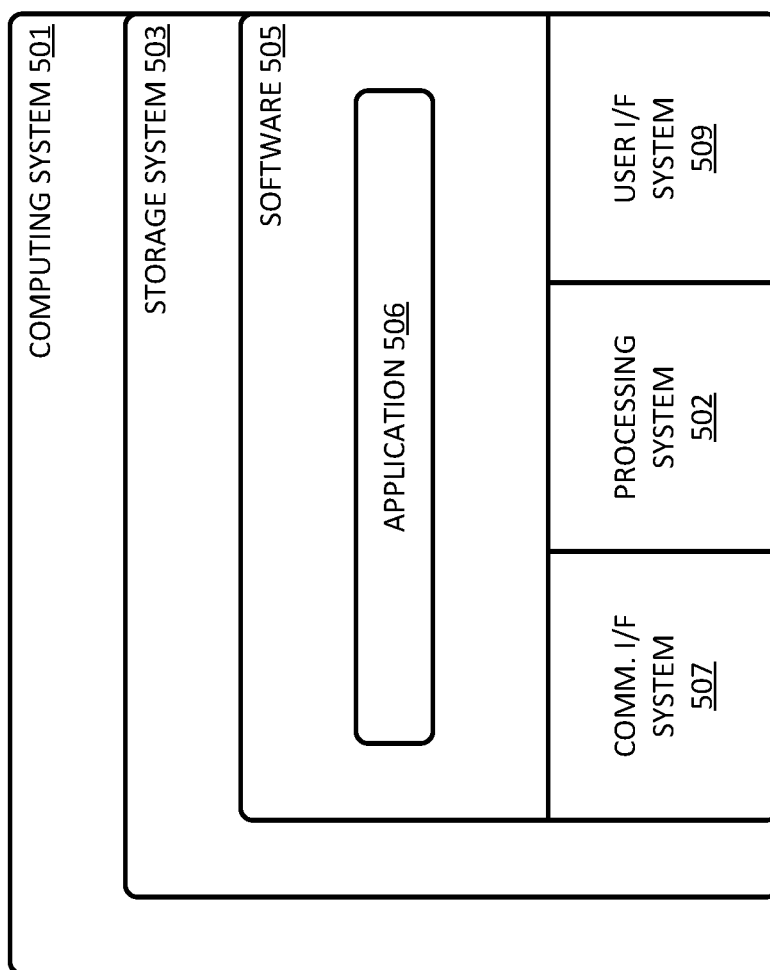
FIG. 5 illustrates a computing system suitable for implementing the enhanced catch-up heuristic technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the applications discussed with respect to the preceding FIGS. 1-4, including collaboration applications described herein. When executed by processing system 502 to enhance catch-up heuristics, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced catch-up heuristic systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced catch-up heuristics. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: identify a set of collaborative activities applied to one or more files hosted by a collaborative application; determine that one or more activities in the set of collaborative activities are relevant to a user of the one or more files hosted by the collaborative application; assign the one or more activities determined to be relevant to the user to one or more relevance categories, where each of the one or more relevance categories has an associated user interface experience; and send at least one notification to surface the one or more activities assigned to at least one of the one or more relevance categories according to the associated user interface experience in a user interface to the collaborative application. In further examples, the set of collaborative activities applied to one or more files hosted by the collaborative application are applied by other users of the one or more files. In further examples, the one or more relevance categories include at least one of an explicitly directed category, an explicitly undirected category, an implicit category, and a general category. In further examples, the program instructions, when executed by the at least one processor, further cause the at least one processor to at least assign a prioritization to the one or more activities assigned to the one or more relevance categories. In further examples, to assign a prioritization to the one or more activities assigned to the one or more relevance categories the program instructions, when executed by the at least one processor, further cause the at least one processor to at least assign a first priority level to the explicitly directed category. In further examples, to assign a prioritization to the one or more activities assigned to the one or more relevance categories the program instructions, when executed by the at least one processor, further cause the at least one processor to at least assign a second priority level to the explicitly undirected category. In further examples, to assign a prioritization to the one or more activities assigned to the one or more relevance categories the program instructions, when executed by the at least one processor, further cause the at least one processor to at least assign a third priority level to the implicit category. In further examples, to assign a prioritization to the one or more activities assigned to the one or more relevance categories the program instructions, when executed by the at least one processor, further cause the at least one processor to at least assign a fourth priority level to the general category.

Further aspects disclosed herein provide an exemplary method for determining one or more relevant activities to surface for a user of one or more files hosted by a collaborative application, the method comprising: capturing a set of collaborative activities that are applied by one or more users to one or more files hosted by the collaborative application; analyzing the set of collaborative activities in relation to the user of the one or more files hosted by the collaborative application; identifying that at least some activities in the set of collaborative activities belong to one or more relevance categories; and assigning a prioritization to the at least some activities that belong to the one or more relevance categories. In further examples, the one or more relevance categories are associated with the user of the one or more files hosted by the collaborative application. In further examples, the one or more relevance categories include at least one of an explicitly directed category, an explicitly undirected category, an implicit category, and a general category. In further examples, assigning a prioritization to the at least some activities that belong to the one or more relevance categories comprises assigning a first priority level to the explicitly directed category. In further examples, assigning a prioritization to the at least some activities that belong to the one or more relevance categories comprises assigning a second priority level to the explicitly undirected category. In further examples, assigning a prioritization to the at least some activities that belong to the one or more relevance categories comprises assigning a third priority level to the implicit category. In further examples, assigning a prioritization to the at least some activities that belong to the one or more relevance categories comprises assigning a fourth priority level to the general category.

Additional aspects disclosed herein provide an exemplary method for creating a user specific experience in a collaborative application, the method comprising: identifying a set of collaborative activities applied to one or more files hosted by the collaborative application; determining whether at least some of the activities in the set of collaborative activities belong to an explicitly directed category; and when it is determined that at least some of the activities in the set of collaborative activities belong to the explicitly directed category, sending at least one notification to surface the activities belonging to the explicitly directed category in a user interface to the collaborative application. In further examples, the method further comprises determining whether at least some of the activities in the set of collaborative activities belong to at least one of an explicitly undirected category, an implicit category, and a general category. In further examples, each of the explicitly directed category, the explicitly undirected category, the implicit category, and the general category has an associated user interface experience. In further examples, the method further comprises assigning a prioritization to the at least some activities that belong to at least one of the explicitly directed category, the explicitly undirected category, the implicit category, and the general category. In further examples, the at least one notification to surface the activities belonging to the explicitly directed category in the user interface to the collaborative application includes an activity badge.

Techniques for determining one or more relevant activities to surface for a user of one or more files hosted by a collaborative application are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of catch-up heuristic systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   one or more computer readable storage media; and
   program instructions stored on the one or more computer readable storage media that, when executed by at least one processor, cause the at least one processor to at least:
   identify a set of collaborative activities applied to one or more files hosted by a collaborative application, wherein each activity of the set of collaborative activities comprises a change applied to a file of the one or more files and wherein each activity of the set of collaborative activities is published by the collaborative application to a substrate;
   determine that an activity in the set of collaborative activities is relevant to a user of the one or more files hosted by the collaborative application;
   determine a relevance category of one or more relevance categories for the activity based on whether the activity includes a directed or undirected reference to the user;
   assign the activity to the relevance category; and
   send at least one notification to surface the activity assigned to the relevance category in a user interface experience associated with the relevance category in a user interface to the collaborative application.

2. The system of claim 1, wherein the set of collaborative activities applied to one or more files hosted by the collaborative application are applied by other users of the one or more files.

3. The system of claim 1, wherein the one or more relevance categories include at least one of an explicitly directed category, an explicitly undirected category, an implicit category, and a general category.

4. The system of claim 3, wherein the program instructions, when executed by the at least one processor, further cause the at least one processor to at least assign a prioritization to the one or more activities assigned to the one or more relevance categories.

5. The system of claim 4, wherein to assign a prioritization to the one or more activities assigned to the one or more relevance categories the program instructions, when executed by the at least one processor, further cause the at least one processor to at least assign a first priority level to the explicitly directed category.

6. The system of claim 4, wherein to assign a prioritization to the one or more activities assigned to the one or more relevance categories the program instructions, when executed by the at least one processor, further cause the at least one processor to at least assign a second priority level to the explicitly undirected category.

7. The system of claim 4, wherein to assign a prioritization to the one or more activities assigned to the one or more relevance categories the program instructions, when executed by the at least one processor, further cause the at least one processor to at least assign a third priority level to the implicit category.

8. The system of claim 4, wherein to assign a prioritization to the one or more activities assigned to the one or more relevance categories the program instructions, when executed by the at least one processor, further cause the at least one processor to at least assign a fourth priority level to the general category.

9. A computer-implemented method for determining one or more relevant activities to surface for a user of one or more files hosted by a collaborative application, the method comprising:
   capturing a set of collaborative activities that are applied by one or more users to one or more files hosted by the collaborative application, wherein each activity of the set of collaborative activities comprises a change applied to a file of the one or more files and wherein the activity is published by the collaborative application to a substrate;
   analyzing the set of collaborative activities in relation to the user of the one or more files hosted by the collaborative application;
   identifying that at least some activities in the set of collaborative activities belong to one or more relevance categories based in part on whether the at least some activities include a directed or undirected reference to the user; and
   assigning a prioritization to the at least some activities that belong to the one or more relevance categories.

10. The computer-implemented method of claim 9, wherein the one or more relevance categories are associated with the user of the one or more files hosted by the collaborative application.

11. The computer-implemented method of claim 9, wherein the one or more relevance categories include at least one of an explicitly directed category, an explicitly undirected category, an implicit category, and a general category.

12. The computer-implemented method of claim 11, wherein assigning a prioritization to the at least some activities that belong to the one or more relevance categories comprises assigning a first priority level to the explicitly directed category.

13. The computer-implemented method of claim 11, wherein assigning a prioritization to the at least some activities that belong to the one or more relevance categories comprises assigning a second priority level to the explicitly undirected category.

14. The computer-implemented method of claim 11, wherein assigning a prioritization to the at least some activities that belong to the one or more relevance categories comprises assigning a third priority level to the implicit category.

15. The computer-implemented method of claim 11, wherein assigning a prioritization to the at least some activities that belong to the one or more relevance categories comprises assigning a fourth priority level to the general category.

16. A computer-implemented method for creating a user specific experience in a collaborative application, the method comprising:
    identifying a set of collaborative activities applied to one or more files hosted by the collaborative application, wherein each activity of the set of collaborative activities comprises a change applied to a file of the one or more files and wherein the activity is published by the collaborative application to a substrate;
    determining whether at least some of the activities in the set of collaborative activities belong to an explicitly directed category or to an explicitly undirected category; and
    when it is determined that at least some of the activities in the set of collaborative activities belong to the explicitly directed category, sending at least one notification to surface the activities belonging to the explicitly directed category in a user interface to the collaborative application.

17. The computer-implemented method of claim 16, further comprising determining whether at least some of the activities in the set of collaborative activities belong to at least one of an explicitly undirected category, an implicit category, and a general category.

18. The computer-implemented method of claim 17, wherein each of the explicitly directed category, the explicitly undirected category, the implicit category, and the general category has an associated user interface experience.

19. The computer-implemented method of claim 17, further comprising assigning a prioritization to the at least some activities that belong to at least one of the explicitly directed category, the explicitly undirected category, the implicit category, and the general category.

20. The computer-implemented method of claim 16, wherein the at least one notification to surface the activities belonging to the explicitly directed category in the user interface to the collaborative application includes an activity badge.

* * * * *